No. 784,860. PATENTED MAR. 14, 1905.
W. A. INWOOD.
TRAINGRAPH.
APPLICATION FILED AUG. 16, 1904.
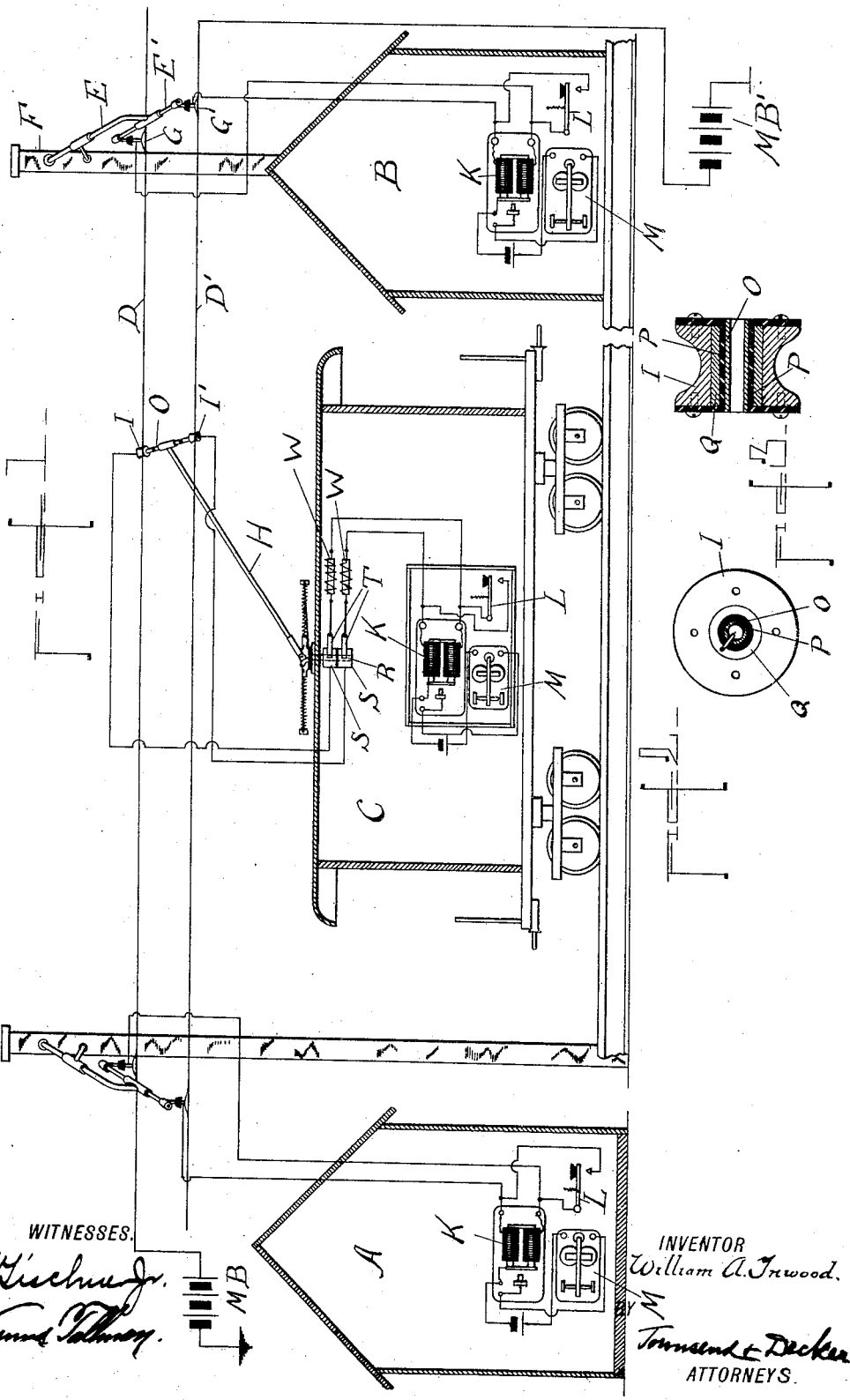
INVENTOR
William A. Inwood.
WITNESSES.
ATTORNEYS.

No. 784,860. Patented March 14, 1905.

UNITED STATES PATENT OFFICE.

WILLIAM A. INWOOD, OF COLORADO SPRINGS, COLORADO.

TRAINGRAPH.

SPECIFICATION forming part of Letters Patent No. 784,860, dated March 14, 1905.

Application filed August 16, 1904. Serial No. 220,888.

*To all whom it may concern:*

Be it known that I, WILLIAM A. INWOOD, a citizen of the United States, and a resident of Colorado Springs, in the county of El Paso and State of Colorado, (with post-office address Colorado Springs, Colorado,) have invented certain new and useful Improvements in Traingraphs, of which the following is a specification.

My invention relates to an improved train-telegraph or means for establishing and maintaining telegraph communication between a moving railway car or vehicle and a fixed station.

The general object of my invention is to produce a system in which it will be possible to employ continuous main-line conductors and to permit telegraphing to be carried on either between a station and a railway car or vehicle, or vice versa, or between different stations or between different railway cars or vehicles.

A further object of my invention is to so organize the system that all the instruments will operate uniformly, inasmuch as all, no matter what the position of the train or car on the track, will be acted upon by currents of the same strength and may therefore be operated with the same margin of adjustment.

By my invention other advantages are also secured, which will be apparent to those skilled in the art from the following description, taken in connection with the accompanying drawings.

In carrying out my invention I propose to use two line conductors insulated from one another and extending continuously along the section of permanent way upon which it is desired that communication should be maintained with a train or any part of the rolling-stock, although it is within my invention to extend such conductors to take in way-stations at a distance from the line of way or removed from the section of track or line of way whereon it is desired to maintain communication with a train. Said line conductors may be sustained or supported in any desired way. For convenience it may be sometimes found desirable to sustain or mount them and insulate them from one another after the manner employed in electric railways for the trolley-wires of a double-trolley system. Connection is made from said wires or conductors to the instrument or instruments on a car or locomotive by suitable collectors insulated from one another and which may be, if desired, like those of a double-trolley system. These collectors serve to take up the current from the said main wires or conductors and pass it through the telegraph instrument on the car or locomotive, and it will therefore be readily understood that said collectors may be of many different forms, although under some circumstances it may be desirable to employ the special construction of devices hereinafter described. and shown in the drawings. In connection with said insulated main conductors I employ two batteries or generators of electricity. One of said batteries is connected to one end of one of said main conductors, the other end of said main conductor being left open. The other battery or generator is connected to the opposite end of the other main conductor, the end of the latter remote from said battery being also left open. The poles of said batteries or generators not connected to said conductors are joined to earth or to any suitable return-conductor. The said batteries or generators have opposite poles connected to said main conductors, respectively, so that current will flow from them in series over said main conductors and through each of the sets of telegraph instruments whether the latter be at a way-station or upon a part of the rolling-stock, but in passing to the various sets of instruments will divide through them in multiple.

In each multiple circuit containing the telegraph instrument or apparatus is a suitable resistance which may, if desired, consist of a resistance of the coil of the receiving-relay, and in addition means are provided for shunting the current passing from one trolley or collector to the other, so as to cut said resistance out of the circuit, thereby permitting the current of the generators or batteries to flow, as it were, on a short circuit, thus diverting the current from the other multiple paths containing the receiving instruments at other stations and causing said instruments to respond. The means for so shunting the current around the resistance in any multiple path from one line conductor to the other would, by preference, consist of any ordinary telegraph-key so connected, however, as to normally remain open, the ordinary circuit-closer being removed or left in position to open the circuit.

Having described my system in its general aspect, I will now proceed to describe one of the forms of apparatus in which the same may be embodied.

In the accompanying drawings, Figure 1 is a general diagram illustrating my invention as carried out on a section of line provided with two way-stations A B and with one traveling or train station C. Fig. 2 is a cross-section through the cross-arm, showing collector-wheel and supporting-arm in side elevation, the protecting-disk being removed. Fig. 3 is a longitudinal section through the collector-wheel and cross-arm.

As will be readily understood, any number of way-stations A B may be employed and also any desired number of traveling stations C. The latter may be the caboose, the locomotive, or any car of the train.

D D' indicate the main conductors, which may be sustained from brackets 3, supported by poles F and carrying cross-arm E', furnished with insulators G G' of any desired type adapted to sustain and insulate the conductors D D'.

H indicates a trolley-arm mounted on the vehicle C in any desired way and carrying at its upper end the cross-arm whose ends are attached to trolley-wheels or collectors I I', insulated from one another in any desired way, but electrically connected, respectively, with the opposite terminals or binding-posts of a relay K in any desired manner, preferably by wires or conductors passing down through the hollow arm H. Connected across the terminals of the relay K is the key L, which in all cases stands in normally open-circuit position, as shown, but when closed shunts the current around the coils of the instrument K and by withdrawing current from other instruments connected to wires D D', as well as from the instrument K on the vehicle C, causes the armature-levers of said instruments to fall against their back contact, and thereby close the local circuit of a suitable sounder M or other receiving instrument. When said key L is permitted to open such shunt-circuit, the armature-levers of all the instruments K are again drawn up to their normal position against their front stops ready for a repetition of the signal. MB indicates the battery or generator connected to main-line conductor D in the manner already described, and MB' indicates the other battery or generator connected to the main-line conductor D'. As will be seen, the current flows from battery MB to conductor D and then through relay K on the vehicle C to conductor D' and then to the opposite pole of generator MB', operating in series with MB, and to earth or common return conductor and back to generator MB. A similar path can be traced for any other cars or vehicles C which might be running on the section of track embraced by conductors D D'.

The two stations A B are shown as equipped similarly to the moving station C, excepting that the instrument K is connected directly to the wires or conductors D D' instead of through trolleys or collectors. As will be obvious, the circuit for these stations would be the same as that for station C, since the current would in each instance flow from the batteries MB MB' in series through the instrument at either of said stations, although, as will be obvious, all of said stations A B C would be in multiple-arc relation to the main conductors D D .

As respects either battery MB or MB' it will be seen that if either alone were used the distance of the fixed station or of the traveling station from the end of the line where said battery is located would affect the potential and the strength of current flowing through the instrument K in said station. By, however, using the two batteries as shown I introduce a compensation for this effect, because as the potential of generator MB affecting any instrument K decreases with the increase of distance of said instrument from the battery MB the potential from battery MB' correspondingly increases, since such instrument is connected to the line D' at a correspondingly nearer point to the battery or generator MB'.

The trolleys or collectors I I' could be mounted on the cross-arm and connected with the wires running to the instruments on the car, as shown more clearly in Fig. 2. O indicates the hollow cross-arm mounted on and communicating with the hollow arm H. On said cross-arm is a heavy band of mica or other insulating material securely fastened thereto near its end, as indicated at P. Securely fixed over said band or sleeve is a sleeve of copper or other good conducting material, forming the axle on which the trolley I or I', also of copper, would turn. The conductor which leads through the hollow arm H would pass through the hollow cross-arm and, as shown in Fig. 2, would lead up through the insulating-sleeve and through the copper sleeve Q, where it would be smoothly soldered or otherwise fastened in a depression on the outside of said band or sleeve. In this manner connection would be established between the wire and the collector or trolley-wheel I turning on the sleeve Q. Each trolley-wheel would be connected in a similar way to a wire leading down the arm or pole H to the car-roof, where they would lead separately through the casting which carries said arm. To provide for reversing the position of the arm without disturbing the connections, the rotary support of the arm is shown provided with a depending shaft R extending through the roof of the car in line with the vertical axis of rotation of the support which carries the arm H. On said shaft are mounted sleeves S S, of conducting material, insulated from one another and engaged, respectively, on their circumference by springs T T. The sleeves S S being connected, respectively, to the wires leading to the trolley-wheels I I' and the springs T T being connected, respectively, to the opposite poles of the instrument-circuit on the car, it is obvious that the position of the arm H may be reversed when the car reverses its direction of travel without disturbing the connection, since the springs T T, which ride freely on the circumference of the sleeves S S, will maintain the connections.

If desired, self-inductive coils W W may be inserted in the car-circuit to prevent disturbance in the action of the relay from irregular movement of the trolley-wheels upon the main conductors B B'. These, however, are not necessary to the operation of the system.

As before stated, my invention is not limited to any particular of supporting the main-line conductors D D' or to any special location of the same or to any particular means for picking up the current therefrom or to any particular form of telegraph receiving instruments or means for shunting the resistance in the car-circuit or instrument-circuit at the fixed stations.

What I claim as my invention is—

1. In a train-telegraph, the combination with two main-line conductors insulated from one another and connected at their opposite ends with generators of electricity operated in series, of telegraph-instrument circuits connected in multiple across said main-line conductors, and means for shunting resistance out of and into the instrument-circuit for the purpose of signaling.

2. In a train-telegraph, the combination of two main-line conductors connected respectively at their opposite ends with generators working in series, and open or dead at their ends remote from said generators, trolleys or collectors mounted on a car or locomotive and bearing respectively on said conductors, a telegraph receiving instrument on the car having its opposite terminals connected respectively to said trolleys or connectors and a telegraph key or transmitter normally open and adapted to shunt the resistance of the instrument-circuit, as and for the purpose described.

3. In a train-telegraph, the combination with a pair of line conductors insulated from one another and forming respectively opposite poles of the circuit, of telegraph-station circuits connected in multiple across said conductors and each normally closed through a receiving instrument, means connected with each circuit and normally in open-circuit position, for establishing a path of lower resistance than the normal resistance of the circuit and collecting devices for maintaining a traveling connection between one of said station-circuits and said line conductors.

4. In a train-telegraph, the combination with a pair of line conductors insulated from one another, open or dead at one end, and connected respectively at their opposite ends remote from one another to opposite poles of suitable generators or batteries, of a telegraph receiving instrument on normally closed circuit across said conductors, and a telegraph-key normally open and connected across the terminals of said instrument.

5. In a train-telegraph, the combination of a pair of line conductors insulated from one another and forming respectively opposite poles of the circuit, a telegraph receiving instrument mounted on the rolling equipment and connected in normally closed circuit across said line conductors, means for maintaining a traveling connection with said conductors and a telegraph-key adapted to shunt said receiving instrument into and out of the circuit.

6. The combination with the reversible trolley-arm and a pair of trolleys or collectors mounted thereon, of a depending post or shaft extending through the roof of the car in line with the vertical axis of rotation of the support which carries the arm, conducting rings or sleeves insulated from one another and mounted on said post or shaft, and springs or brushes engaging respectively with said sleeves, as and for the purpose described.

7. The combination with the reversible trolley-arm carrying a pair of trolleys insulated from one another, of a rotatable support for said arm, a pair of conducting rings or sleeves rotating therewith, and springs or brushes bearing on said sleeves, as and for the purpose described.

Signed at Colorado Springs, in the county of El Paso and State of Colorado, this 10th day of August, A. D. 1904.

WILLIAM A. INWOOD.

Witnesses:
CHARLES CLYDE SPICER,
J. A. ELSTON.